United States Patent
Kempas

[19]
[11] Patent Number: 5,892,310
[45] Date of Patent: Apr. 6, 1999

[54] TORQUER ASSEMBLY

[75] Inventor: Hagen Kempas, Uberlingen, Germany

[73] Assignee: Bodenseewerk Geratetechnik GmbH, Uberlingen, Germany

[21] Appl. No.: 722,290

[22] Filed: Sep. 27, 1996

[30] Foreign Application Priority Data

Sep. 27, 1995 [DE] Germany ................ 195 35 905.4

[51] Int. Cl.$^6$ ................ H02K 21/00; H02K 37/10; H02K 7/06
[52] U.S. Cl. ................ 310/152; 310/46; 310/82
[58] Field of Search ................ 310/46, 152, 82, 310/254; 248/646, 651, 652, 664, 371, 398, 667; 297/330, 344.23

[56] References Cited

U.S. PATENT DOCUMENTS

| | | | |
|---|---|---|---|
| 3,530,318 | 9/1970 | Newell | 310/82 |
| 3,559,936 | 2/1971 | Guyon | 248/179 |
| 3,585,425 | 6/1971 | Newell | 310/82 |
| 3,609,422 | 9/1971 | Nordin | 310/82 |
| 4,056,760 | 11/1977 | Frenk | 310/82 |
| 4,785,212 | 11/1988 | Downer et al. | 310/90.5 |
| 4,874,998 | 10/1989 | Hollis, Jr. | 310/90.5 |
| 5,105,669 | 4/1992 | Gruber | 74/5.46 |
| 5,142,932 | 9/1992 | Moya et al. | 310/82 |
| 5,204,573 | 4/1993 | Bederson et al. | 310/91 |
| 5,252,870 | 10/1993 | Jacobsen et al. | 310/82 |

FOREIGN PATENT DOCUMENTS

| | | |
|---|---|---|
| 0444445A1 | 9/1991 | European Pat. Off. . |
| WO 85/00055 | 1/1985 | WIPO . |
| WO 88/05996 | 8/1988 | WIPO . |

*Primary Examiner*—Clayton LaBalle
*Attorney, Agent, or Firm*—McDermott, Will & Emery

[57] ABSTRACT

A torquer assembly is to exert torques about two mutually orthogonal axes on a platform which is mounted for universal movement about a central swivelling point. To this end, a stator having four pairs of pole pieces is provided. The pole pieces are angularly spaced by 90° about an axis passing through the swivelling point. The pole pieces of each pair define an air gap therebetween. The air gap is limited by spherical surfaces. The spherical surfaces are curved about the swivelling point. Permanent magnets together with the pole pieces and magnetic return loops form magnetic circuits, a magnetic field being generated in the air gaps. An armature with four elongated, arcuate coils angularly offset with respect to each other by 90° is connected with the platform. The coils have circumferentially extending turns. Each of these coils extends, with an arcuate coil section, into the air gap of a respective one of the pairs of pole pieces.

1 Claim, 12 Drawing Sheets

2

TORQUER ASSEMBLY

TECHNICAL FIELD

The invention relates to a torquer assembly for exerting torques on a platform, which is mounted for universal movement about a central swivelling point, about two mutually orthogonal axes.

BACKGROUND ART

A torquer assembly may be energized or controlled by an inertial sensor unit, in order to stabilize a platform in inertial space. The platform may be a seeker in a target tracking missile, the seeker being de-coupled from the motions of the missile through am inertial sensor unit and the torquer assembly. The usefulness of the torquer assembly is, however, not limited to these applications.

Conventionally, a platform is mounted in gimbals. Torquers are placed on the gimbal axes and act between the structure and the outer gimbal or between the gimbals, respectively, each torquer about one associated gimbal axes. The platform represents the inner gimbal.

The prior art torquer assemblies are expensive and bulky, and, in many cases such as in seeker heads for target tracking missiles, can hardly be employed.

SUMMARY OF THE INVENTION

It is the object of the invention, to provide a simple and space-saving torquer assembly.

According to the invention, this object is achieved by a two-axis torquer assembly engaging the platform directly. A stator has four pairs of pole pieces. The pole pieces are angularly spaced from each other by 90° about an axis passing through a swivelling point about which the platform is universally movable. Each pair of pole pieces consists of an outer pole piece and an inner pole piece defining an air gap therebetween. The air gap is limited by spherical surfaces of the pole pieces. These spherical surfaces are curved about the swivelling point. Permanent magnets, together with said pole pieces provide a magnetic circuit generating a radial magnetic field within the air gap. An armature is connected with the platform. This armature has four elongated, arcuate coils with circumferentially extending turns. These coils are mutually offset by 90°. An arcuate coil section of each of the coils extending into the air gap of an associated one of said pairs of pole pieces.

According to the invention, the torquer assembly does not act on the platform through the gimbal axes but engages the platform directly. A pair of diametrically opposite coils defines a platform-fixed x-axis. The pair of coils angularly offset thereto by 90° defines a platform-fixed y-axis orthogonal to the x-axis. The x-axis and the y-axis intersect in the swivelling point of the platform. The coils located on the x-axis with the associated magnetic circuits form a torquer directly acting on the platform about the y-axis. Similarly, the coils located on the y-axis with the associated magnetic circuits form a torquer, which also directly acts on the platform about the x-axis. The swivelling point is determined independently of the torquer assembly, for example by a gimbal mounting of the platform. This gimbal mounting may be a space-saving "internal" gimbal mounting. When a current flows through a coil, this current generates a force orthogonal to the current flowing circumferentially with respect to the platform, and orthogonal to the radial magnetic field. This force generates the torque about the swivelling point. Even if the platform is tilted, for example, about the x-axis, part of the coil of th the torquer acting about the y-axis is still within the air gap of the associated magnetic circuit.

An embodiment of the invention is described in greater detail hereinbelow with reference to the accompanying drawings.

DETAILED DESCRIPTION OF ILLUSTRATED EMBODIMENTS

Figure 1:
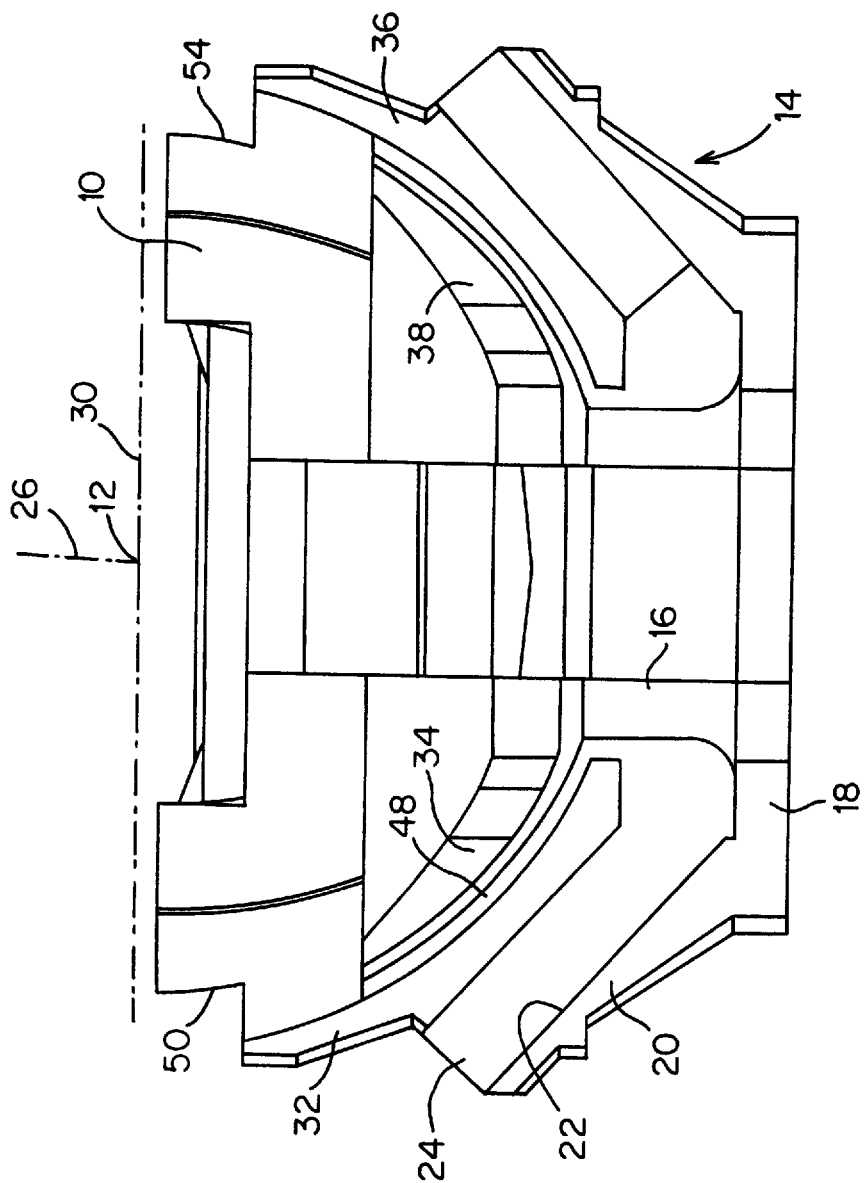
FIG. 1 shows a side elevation of a torquer assembly wherein the platform on which the torques are exerted is in a central position.

Referring to FIG. 1, numeral 10 designates a platform. The platform 10 is mounted for universal movement about a central swivelling point 12 by means of an internal gimbal mounting (not shown). A stator 14 in a torquer assembly is centered with respect to the swivelling point 12. The stator 14 has a tubular central part 16 of magnetizable material. Four radial flange elements 18 are provided at the tubular central part 16 on the side thereof remote from the platform. The flange elements 18 are angularly offset with respect to each other by 90°. Magnet carriers 20 with plane support surfaces 22 extending substantially tangentially with respect to the swivelling point 12 are integral with the flange elements 18. Flat-parallelepipedal permanent magnets 24 having an upper surface and a lower surface parallel thereto are attached, with their lower surfaces, to respective ones of the magnet carriers 20. The permanent magnets 24 are magnetized perpendicular to the upper and lower surfaces. Thus the permanent magnets generate a magnetic field which is substantially radial with respect to the swivelling point.

Four pairs of pole pieces are provided on the stator. The pole pieces are angularly spaced by 90° about an axis passing through the swivelling point 12. Angularly, the pole pieces are aligned with the flange elements 18 and the magnet carriers 20. The pole pieces of each pair define an air gap therebetween. Each of the air gaps is limited by spherical surfaces. The spherical surfaces are curved about the swivelling point 12. The outer pole pieces of each pair are attached on the upper sides of the respective permanent magnets 24. The inner pole pieces are integral with the tubular central part 16 at the end thereof facing the platform 10.

Figure 2:
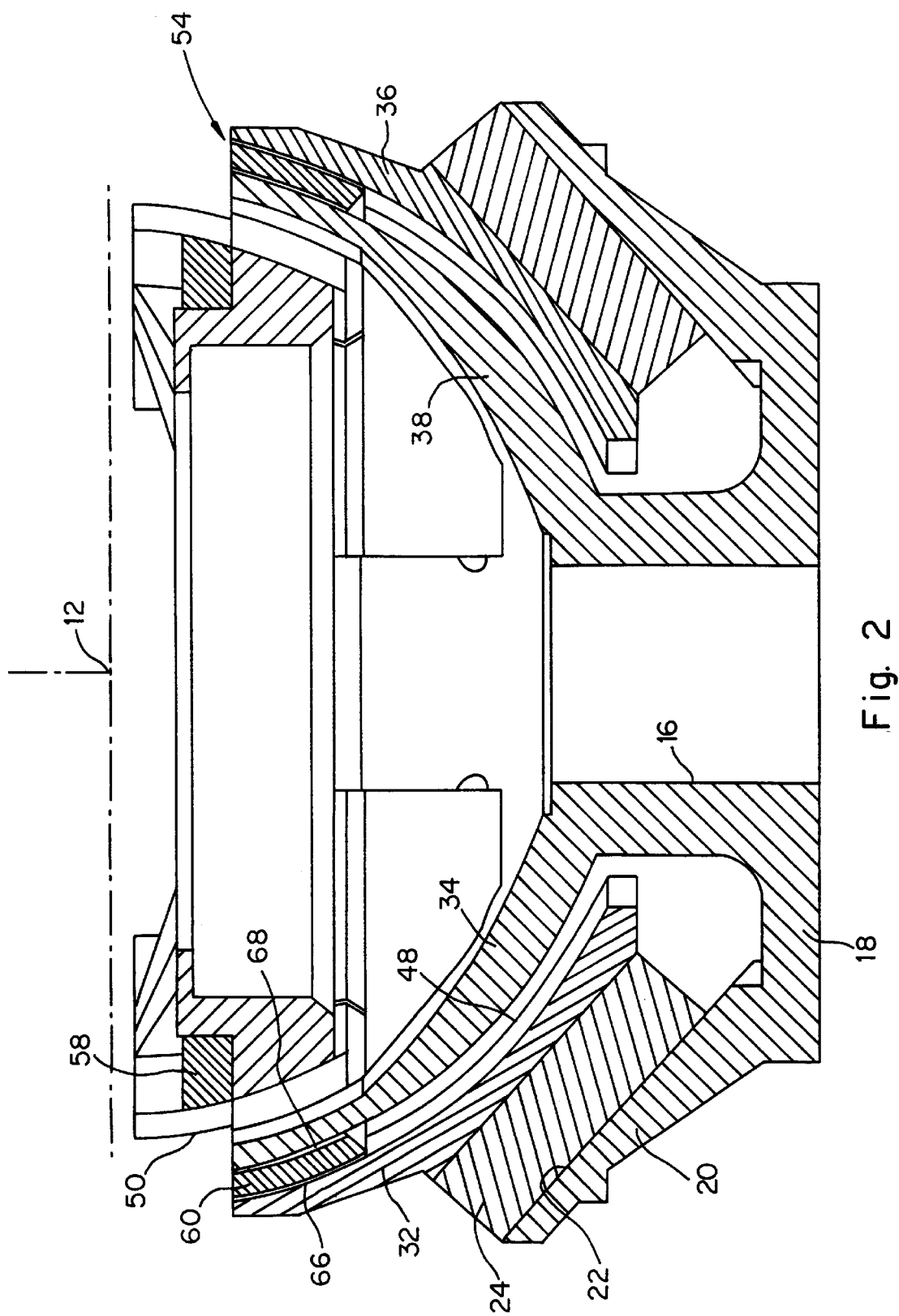
FIG. 2 is a longitudinal sectional view of the torquer assembly of FIG. 1.
Figure 3:
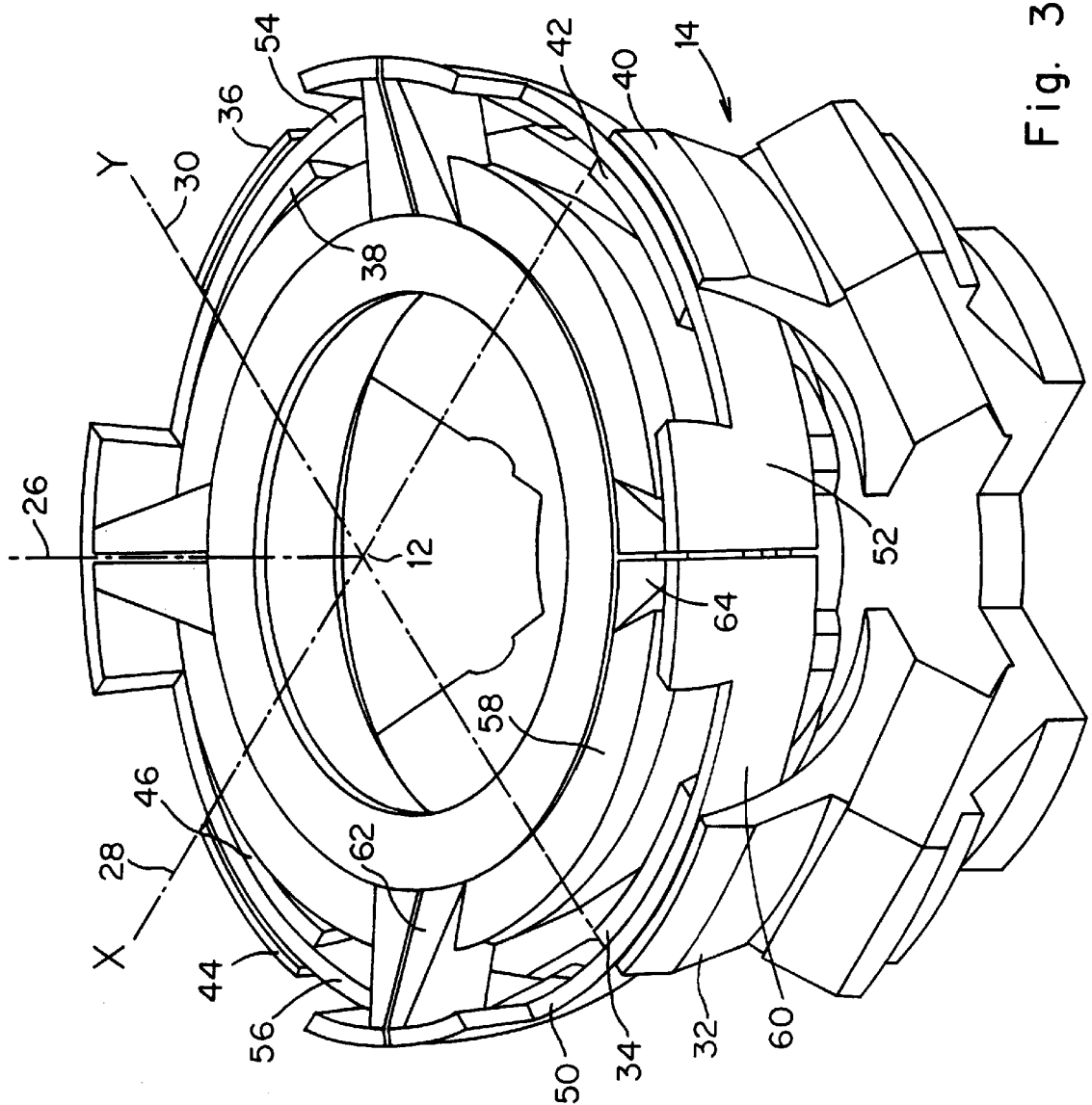
FIG. 3 is a perspective view of the torquer assembly of FIGS. 1 and 2.
Figure 4:
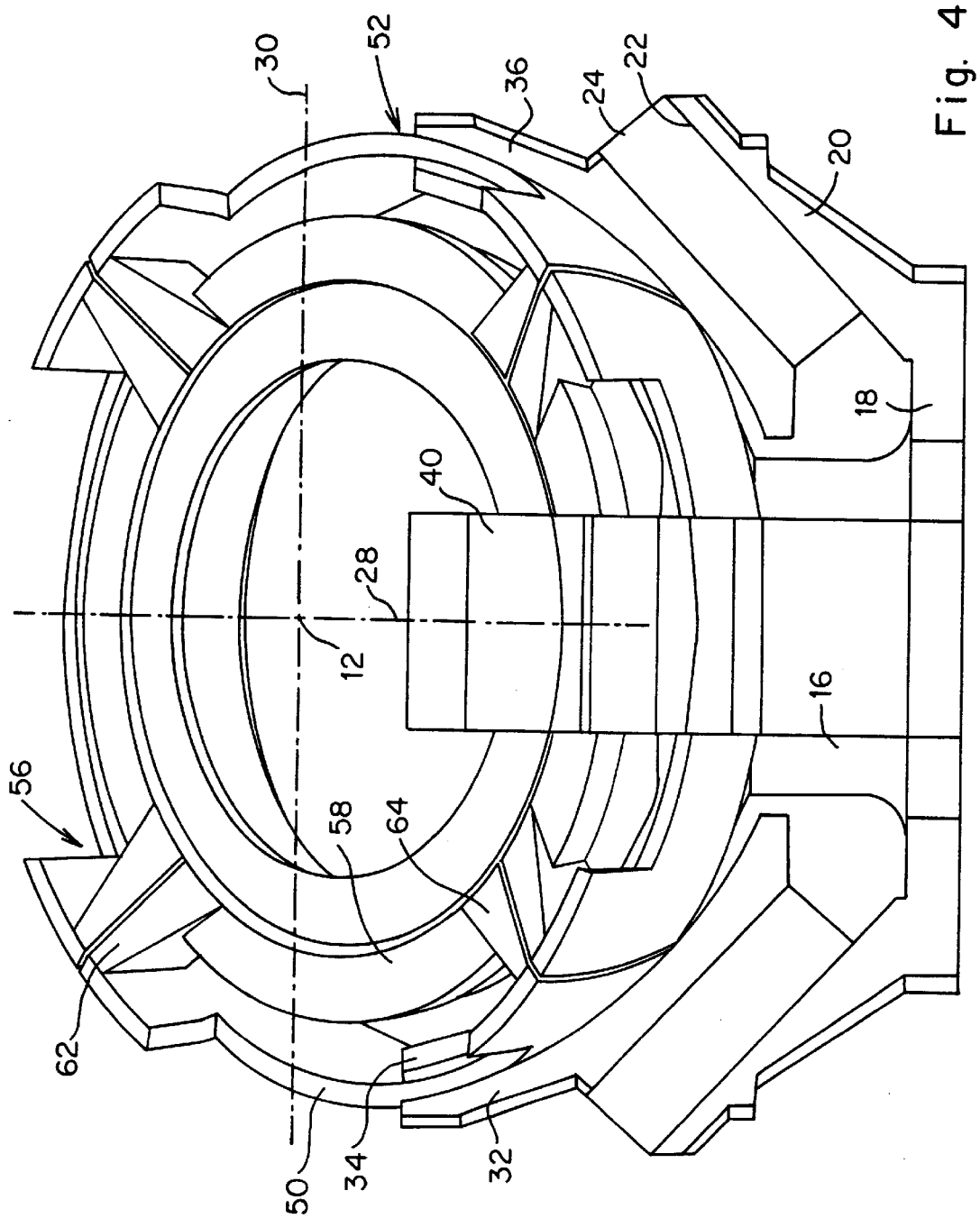
FIG. 4 shows a side elevation of a torquer assembly similar to FIG. 1, wherein the platform is rotated by 40° about the y-axis.
Figure 6:
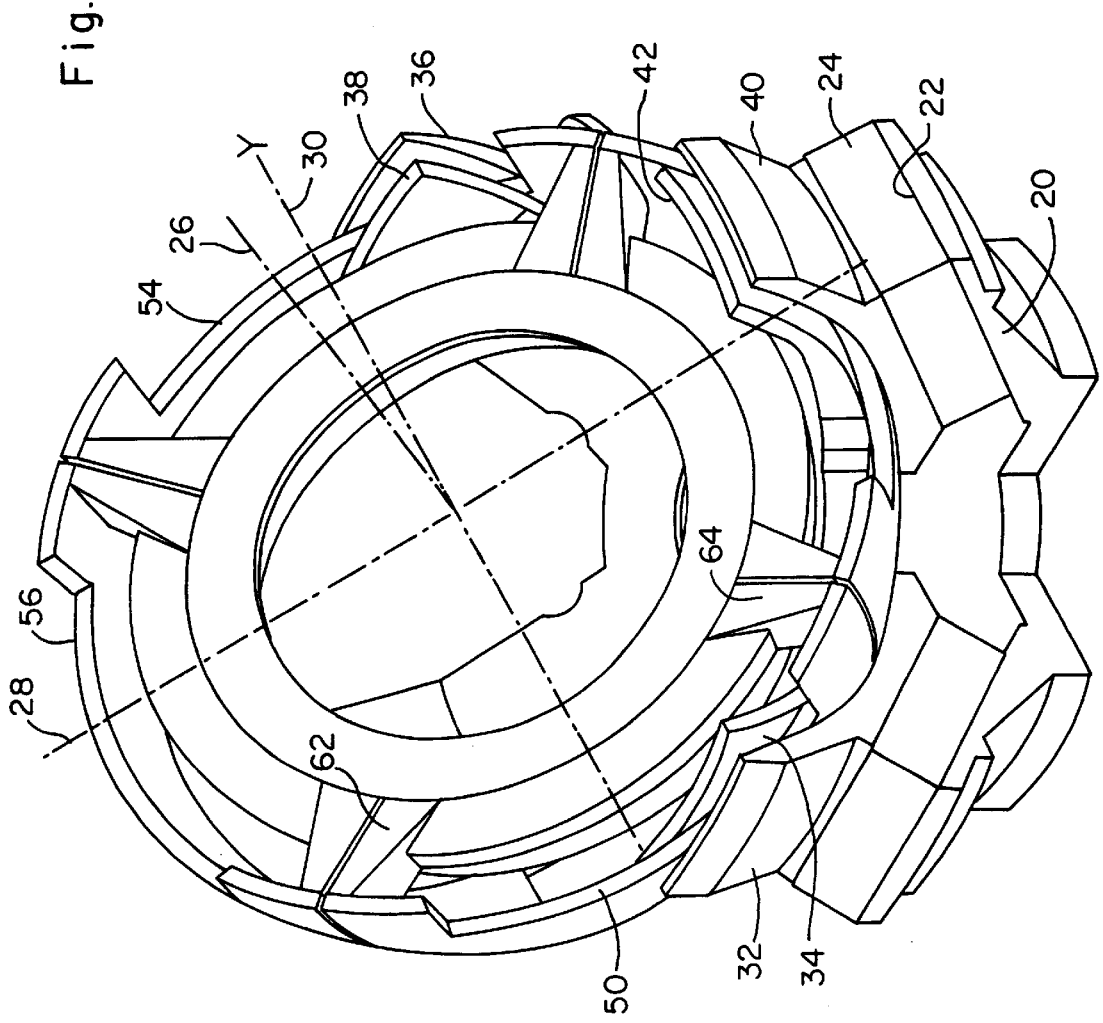
FIG. 6 is a perspective view of the torquer assembly of FIGS. 4 and 5.
Figure 7:
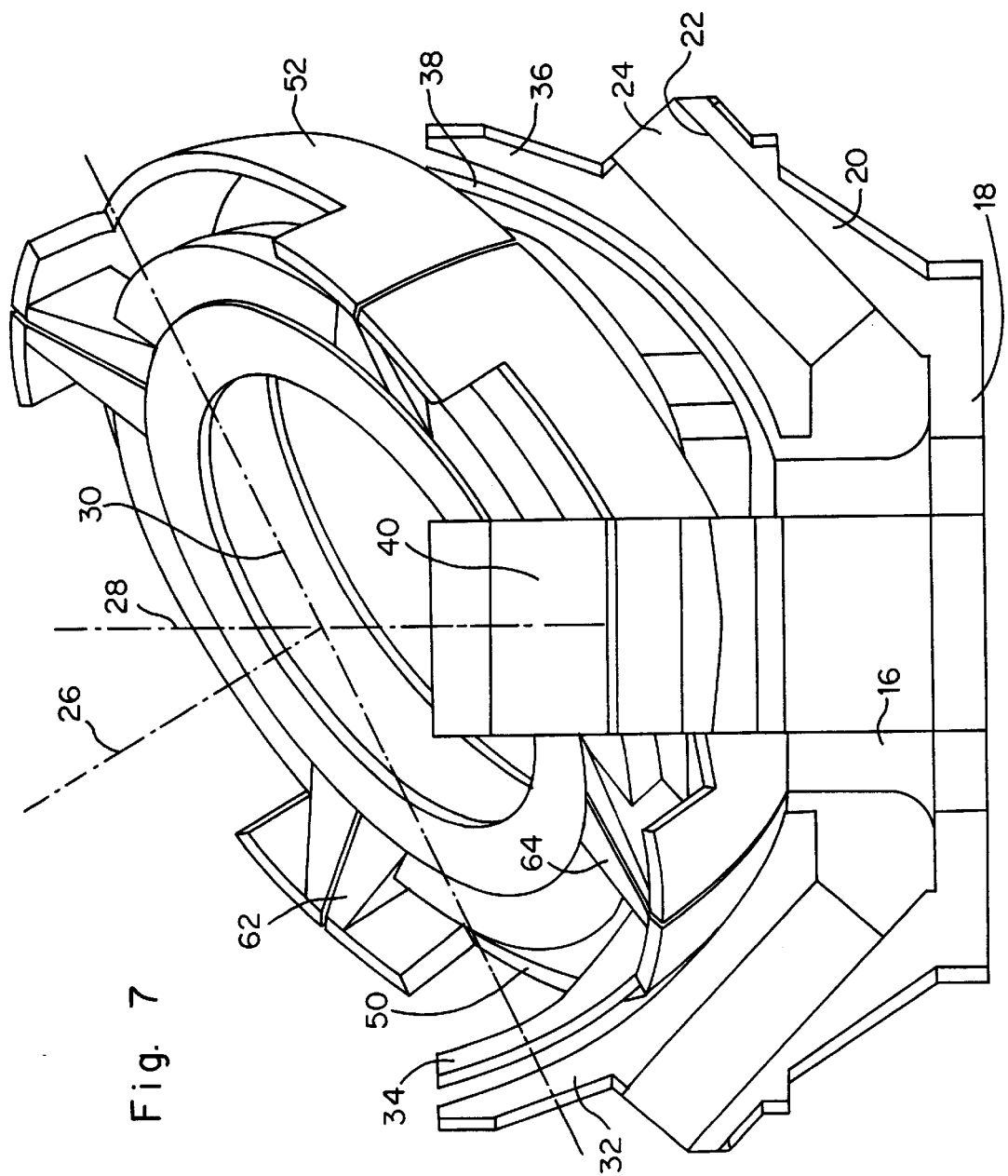
FIG. 7 shows a side elevation of a torquer assembly similar to FIGS. 1 or 4, wherein the platform, on which the torques act, is rotated by 40°*sin 45° both about the x-axis and about the y-axis.
Figure 8:
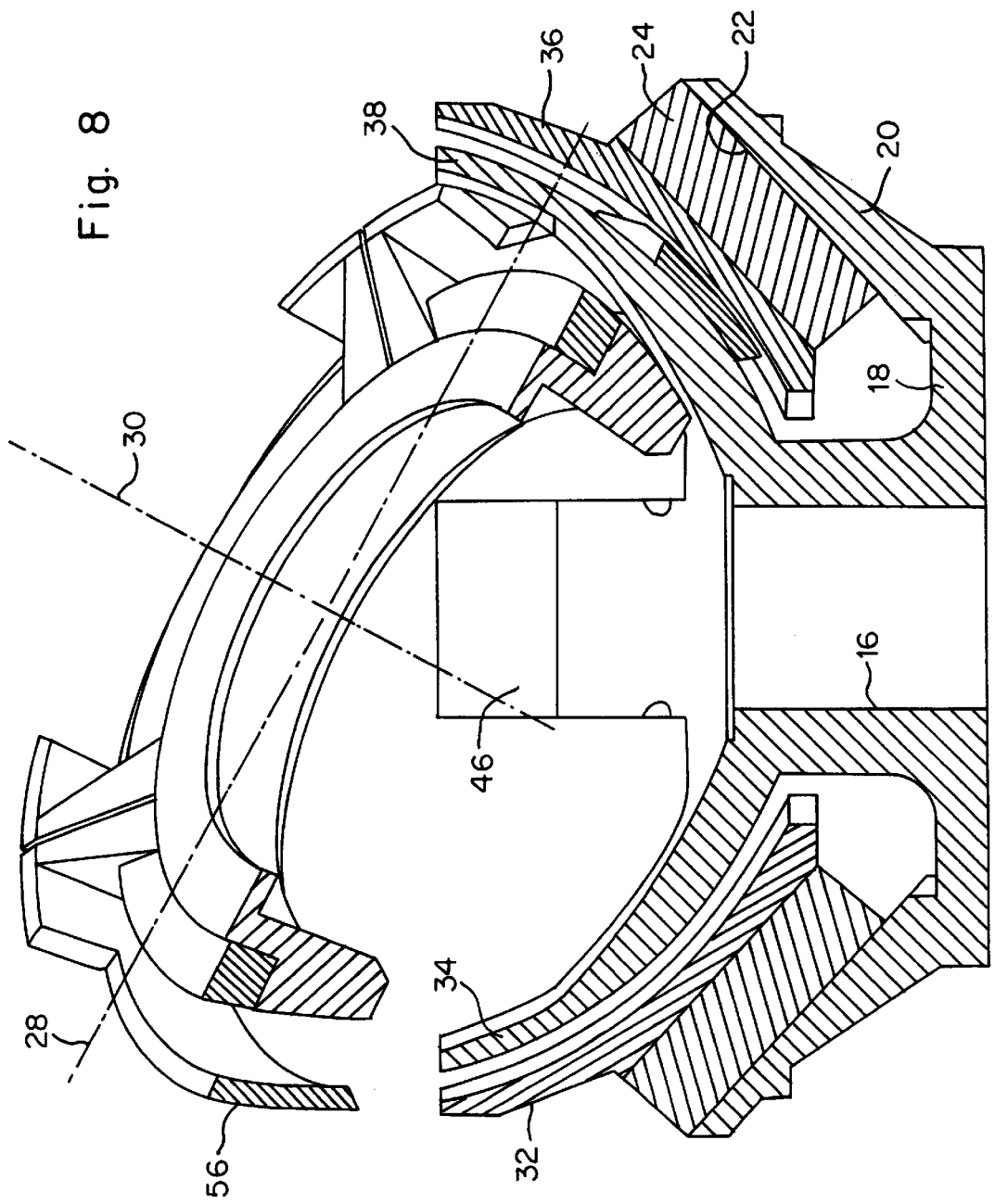
FIG. 8 is a longitudinal sectional view of the rotated torquer assembly of FIG. 7.
Figure 9:
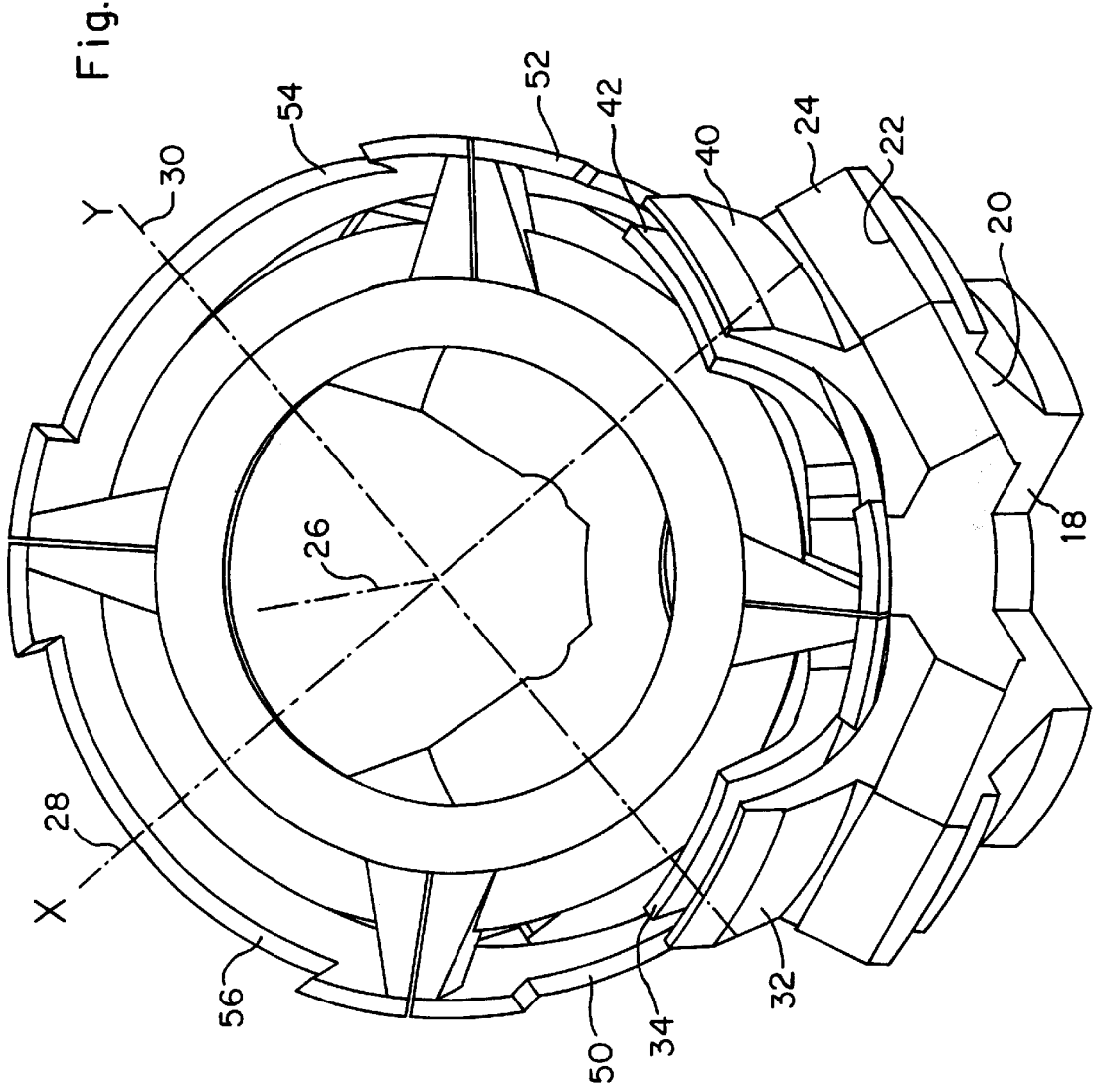
FIG. 9 is a perspective view of the torquer assembly of FIGS. 7 and 8.

As can best be seen from FIGS. 3 and 6, a platform-fixed coordinate system is defined with a z-axis normal to the plane of the platform and vertical in FIG. 3, an x- and y-axes orthogonal to the z-axis and to each other. The coordinate origin coincides with the swivelling point 12. Vertical planes pass through the x-axis 28 and the y-axis 30, as viewed in FIG. 3. One of these vertical planes is the plane of the paper in FIG. 2. The other vertical plane is perpendicular thereto through the z-axis 26. The flange elements, magnet carriers, permanent magnets and pole pieces are symmetrical to these vertical planes. Two diametrically opposite pairs of pole pieces 32 and 34, and 36 and 38, respectively, can be recognized in FIGS. 1 and 2. In FIG. 3, the pair of pole pieces 32 and 34 can be seen in the foreground, and a pair of pole pieces 40 and 42 is visible angularly offset thereto by 90°. In the background, the ends of the respective diametrically opposite pole pieces 36 and 38, and 44 and 46, respectively, can be recognized. The pole pieces 32, 36, 40 and 44 are "outer" pole pieces, i.e. are farther away from the swivelling point 12 than the "inner" pole pieces 34, 38, 42 and 46. Air gaps 48 are defined between the outer and inner pole pieces, for example 32 and 34, respectively. The air gap 48 is limited by spherical surfaces centered to the swivelling point 12. A magnetic circuit extends from one, the inner, pole face of the permanent magnet 24 through the outer pole piece 32, the air gap 48, the inner pole piece 34, the tubular central part 16, the flange element 18 and the magnet carrier 20 to the other, the outer, pole face of the permanent magnet. Thereby, a substantially radial magnetic field is generated in the air gap 48. With such an arrangement, the magnetic lines of force are distributed uniformly over the surface of the air gap 48. The remaining pairs of pole pieces are designed correspondingly.

Four coils 50, 52, 54 and 56 angularly offset with respect to each other by 90° are attached to the platform. The coils 50 and 54 are diametrically opposite, and the coils 52 and 56 are diametrically opposite. The coils 50, 52, 54 and 56 are arcuate. Herein, the coil 50 will be described. The remaining coils are identical therewith.

The coil 50 has an arcuate inner section 58 and an also arcuate outer section 60. Inner section 58 and outer section 60 are interconnected by short end sections 62 and 64. In the inner section 58 and in the outer section 60, the wires extend circumferentially with respect to the platform 10. In the end sections 62 and 64, the wires extend radially. Turns are formed which are substantially parallel to the plane of the platform 10 or to a plane which is perpendicular to the paper plane of FIG. 2. The outer section 60 is limited by spherical surfaces 66 and 68 curved around the swivelling point 12. As can be seen best from FIGS. 2 and 3, the wires of the turns in the inner section 58 are wound in a plurality of layers one upon the other, whereby a compact bundle is obtained. In the end sections 62 and 64, the wires are fanned out. The outer sections 60 are flat with one layer or few layers of turns with comparatively large axial dimensions, whereby the outer sections 60 are able to extend into a rather narrow air gap 48.

The end sections of the coils 50, 52, 54 and 56 are adjacent each other. Each of the coils 50, 52, 54 and 56 extends around one of the pole pieces 34, 42, 38 and 46, respectively. The respective outer sections 60 are movable in the air gaps 48 between the outer pole pieces and the inner pole pieces, for example between the pole pieces 32 and 34 or 36 and 38, respectively, in FIG. 2.

Each pair of diametrically opposite coils and magnetic circuits form a torquer acting about one axis. The coils 50 and 54 together with the magnetic circuits flowing through the pole pieces 32 and 34, and 36 and 38, respectively, form a torquer 28 acting about the x-axis. Forces are exerted on the coils, the directions of these forces being orthogonal to the radial direction of the magnetic field and orthogonal to the current flowing circumferentially through the coils, thus tangential in the longitudinal plane passing through the axis of the central part 16, substantially the plane of the paper in FIG. 2. Correspondingly, the coils 52 and 56 with the magnetic circuits flowing through the pole pieces 40 and 42, and 44 and 46, respectively, form a torquer acting about the y-axis. The torquers are energized by currents which are applied to the coils. Thereby, the torquers, through the coils, engage directly the platform 10 and do not act on the shafts of the gimbal mounting of the platform.

Figure 5:
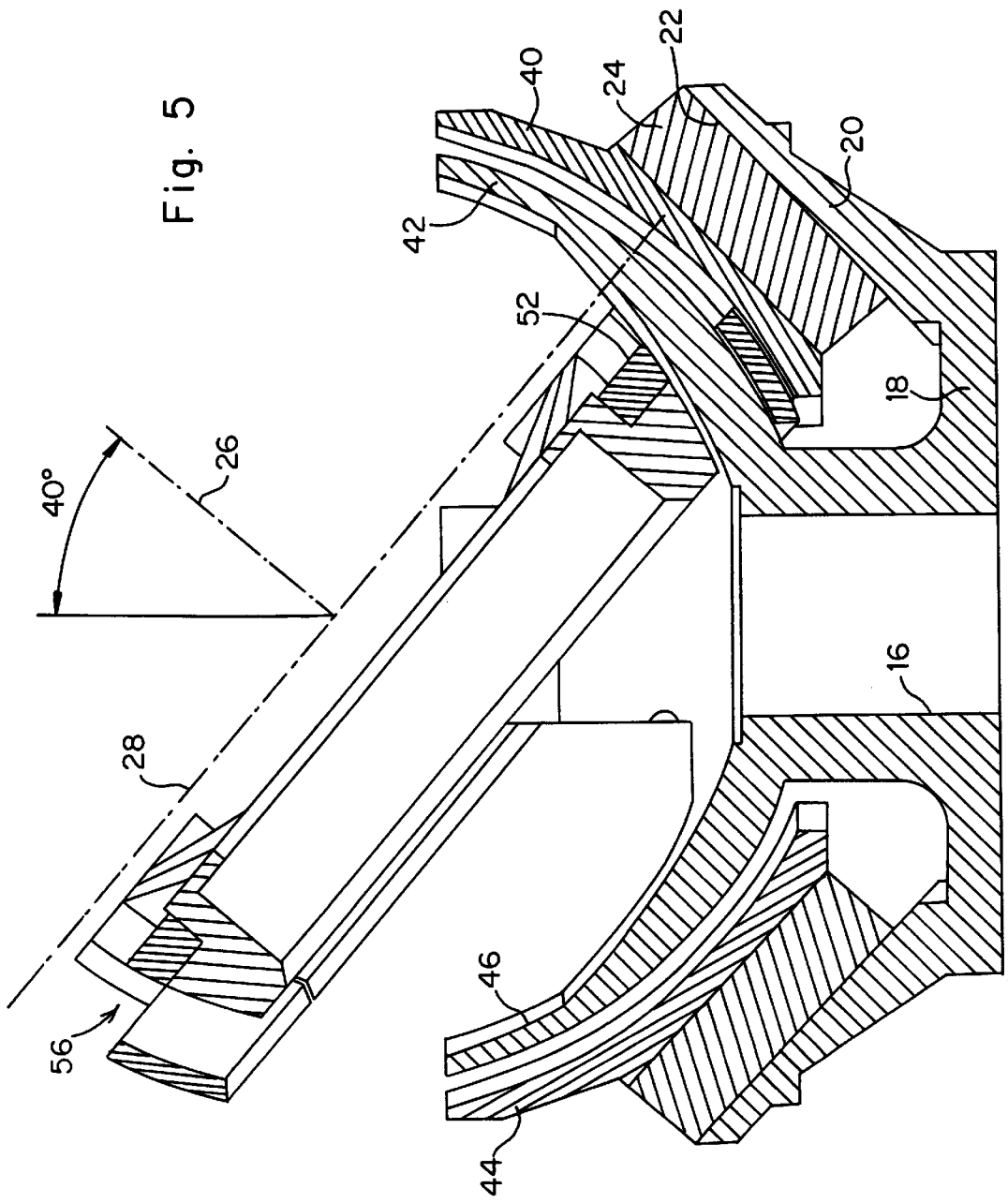
FIG. 5 is a longitudinal sectional view similar to FIG. 2 of the torquer assembly of FIG. 4 rotated by 40° about the y-axis.

As can be seen best from FIG. 5, the platform can be tilted about the x-axis up to an angle of 40°. Within this range, the outer section 60 of the coil 54 remains within the air gap between the pole pieces 36 and 38. The torque exerted on the coil 54 by a selected current through the coil 54 is not affected thereby, as the magnetic field is the same all over the air gap. In this position of the platform, the coil 50 is completely removed from the air gap 48 and does not contribute to the torque. Correspondingly (not shown), the platform 10 can be moved counter-clockwise from the position shown in FIG. 1 through 40°. Then the coil 50 becomes effective, and the coil 54 is removed from the air gap. Thus a total swivelling angle of 80° is available.

With such a tilting of the platform 10 about the x-axis 28 only, the coils 52 and 56 are rotated relative to the associated pole pieces 40, 42 and 44,46, respectively, within the air gap. As the coils are spaced from the x-axis passing through the swivelling point 12, as can be seen from FIGS. 2 and 5, the coils will also make a translatory movement relative to the pole pieces, as can be seen best from FIG. 6. Because of the spherical shapes centered to the swivelling point 12 of the air gap and of the outer section of the coil, and because of the arcuate shape of the coil, this is geometrically possible.

Figure 10:
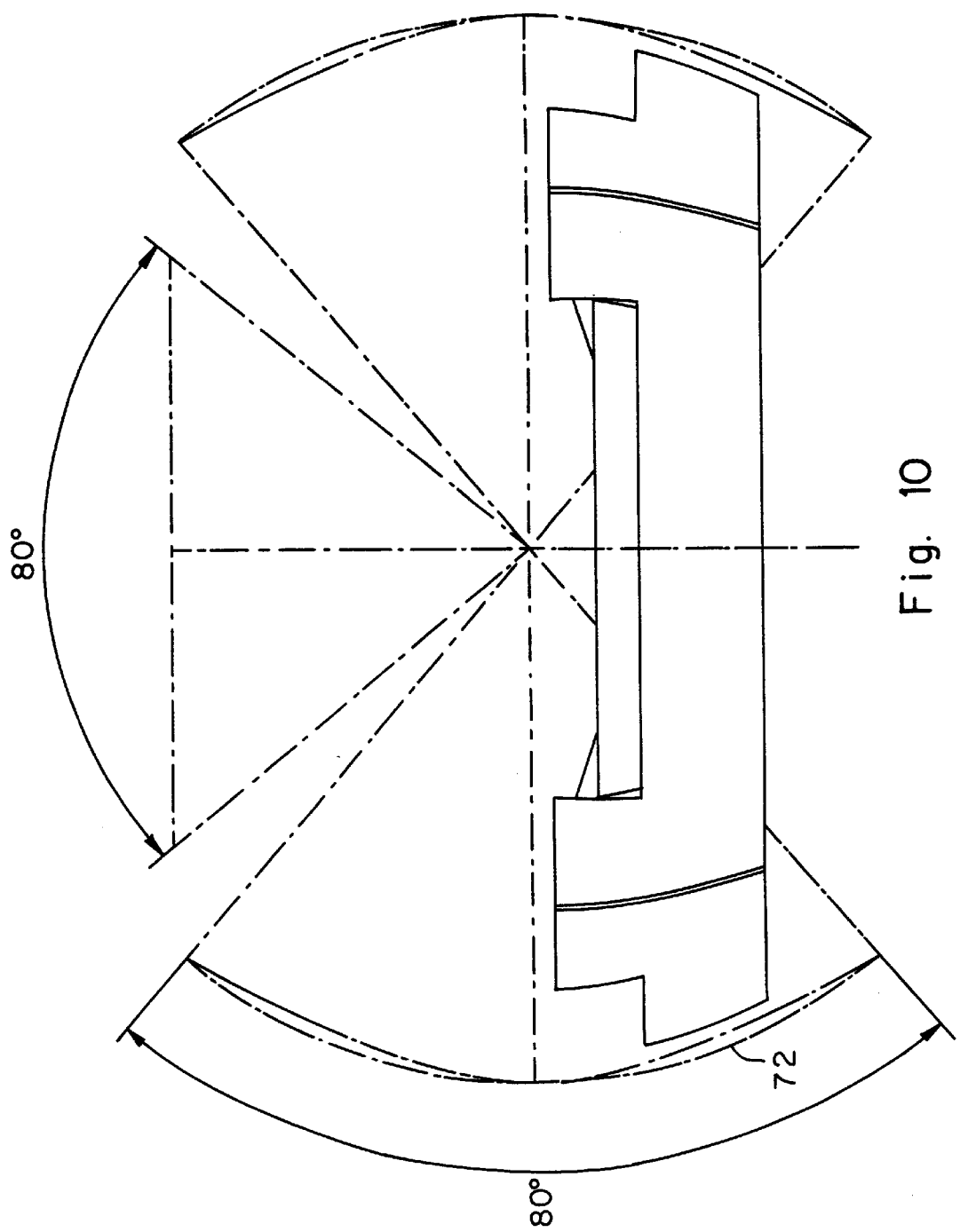
FIG. 10 is a schematic illustration of the platform and shows the geometric relations.
Figure 11:
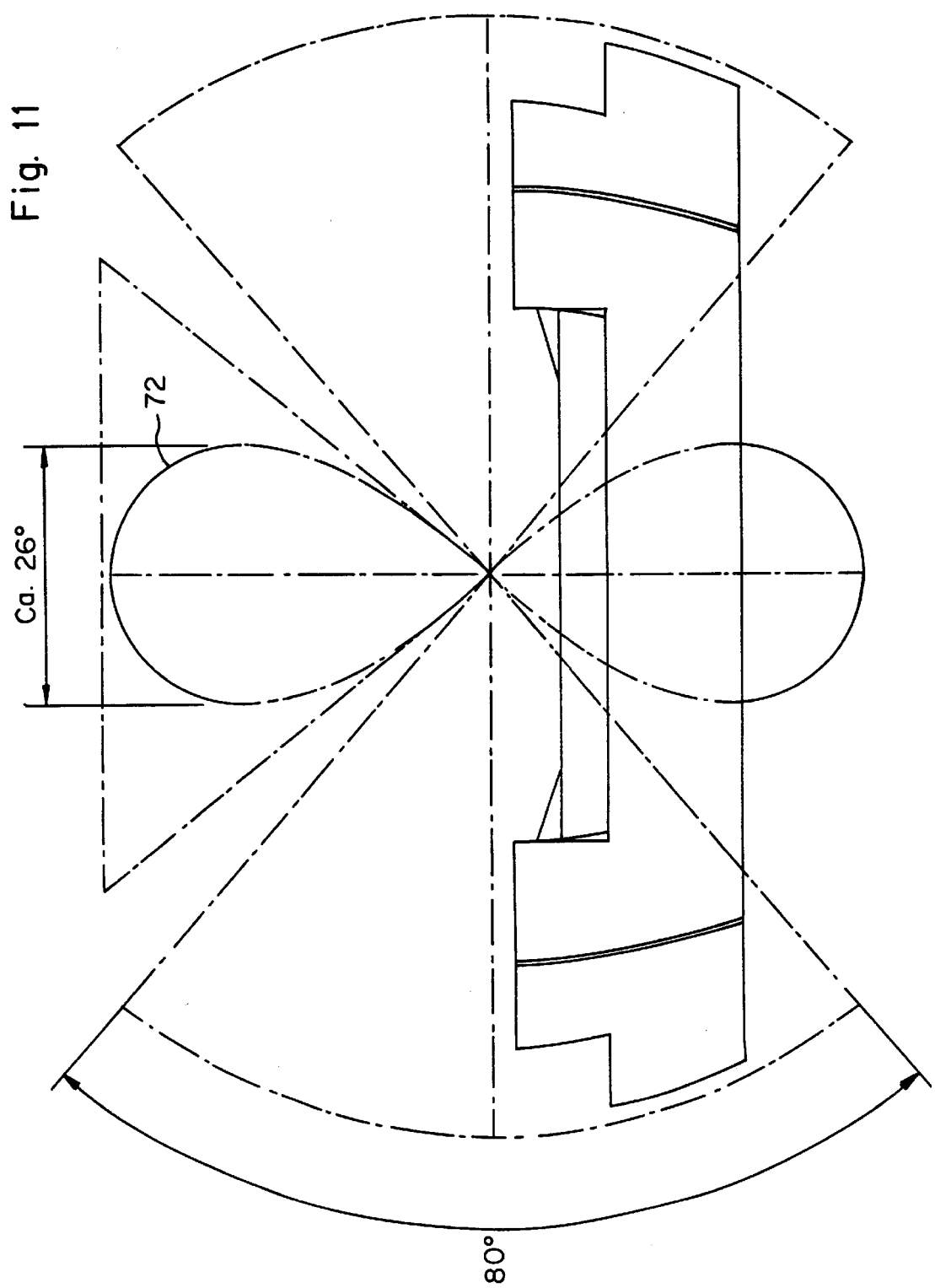
FIG. 11 is a schematic illustration similar to FIG. 10 and shows the movement of a peripheral point lying on the x-axis, for example of a point of a coil arranged symmetrically to the x-axis, if the platform, with maximum positive or negative inclination about the x-axis, is additionally rotated about the y-axis between the maximum angles, the platform being suspended on a two-axis cardan joint.
Figure 12:
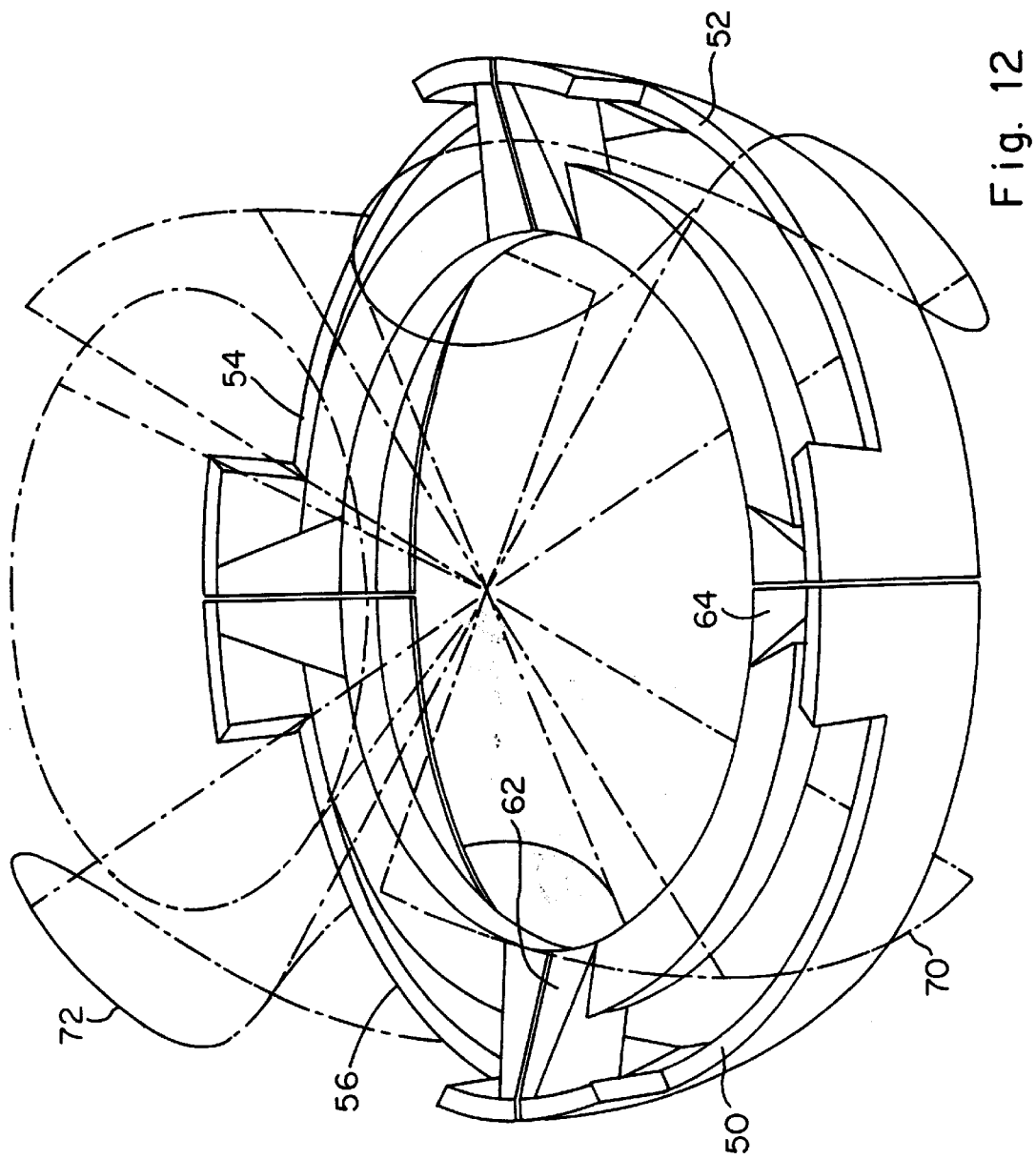
FIG. 12 is an associated perspective view.

In similar way, the platform can be rotated about the y-axis. With such rotation, the torqer acting about the y-axis and formed by the coils 52 and 56 and the associated magnetic circuits remains operative in similar way independently of the angle of rotation. As can be seen from FIGS. 7 to 9, the platform may also be rotated, starting from the position of FIGS. 1 to 3, simultaneously about the x-axis 28 and about the y-axis 30. This causes a translatory movement of the axes relative to the stator. This is illustrated in FIGS. 10 to 12. FIG. 10 shows a side elevation of the stator with the movements of the coordinate axes, as viewed in the direction of the y-axis of FIG. 3. FIG. 11 shows a side elevation of the stator with the movements of the coordinate axes, as viewed normal to the y-axis. FIG. 12 is a perspective view with the movements of the coordinate axes.

It is assumed that the platform 10 has been rotated about the x-axis 28 from the position of FIG. 3 through 40° to one side or the other. This is illustrated by the 80°-angle in FIG. 11 and by the arch 70 un FIG. 12. These are the two end positions of the platform 10 about the x-axis 28. During this movement, the x-axis maintains its position relative to the stator. The y-axis describes the arch 70. If the, starting from this inclined position, the x-axis is moved about the y-axis between its two extreme positions, then the x-axis describes an "8", one half of this "8" being associated with one end position of the platform about the x-axis, and the other half of the "8" being associated with the other end position of the platform. With smaller swivelling angles, the "8"-traces are correspondingly smaller.

This is illustrated for maximum swivelling angles in FIGS. 10 to 12. In FIG. 11, the "8"-trace described by the x-axis is designated by 72. As can be seen from FIGS. 10 and 12, the "8"-traces 72 lie on spherical surfaces.

Such movements are also carried out by the coils 50, 52, 54 and 56, which are centered to the axes of the platform. Because of the elongated-arcuate shape of the coils 50, 52, 54 and 56, these movements are possible.

The two-axis torquer assembly described hereinbefore offers essential advantages:

The torquer assembly has small size. The torquer assembly permits a large swivelling range of the platform 10. The torques are substantially always generated in the system of axes of the platform 10.

The inductance of the coils 50, 52, 54 and 56 is low, whereby a high cut-off frequency is achieved. The torquer assembly, virtually, has no response threshold, no friction, no hysteresis, no reluctance torques, a small movable mass and a low electrical time constant. Therefore, if used for adjusting a seeker in a missile, the torquer assembly operates unobjectionably even with high roll rates and with the occurrence of look angles.

I claim:

1. A stabilized platform comprising:

mounting means for mounting said platform for universal movement about a central swivelling point relative to a structure;

a torquer assembly for rotating said platform about said central swivelling point; and an inertial sensor unit configured to control said torquer assembly so as to stabilize said platform in inertial space, wherein said torquer assembly further comprises:

a first structure-fixed torquer means, and a second structure-fixed torquer means, wherein said first and second structure-fixed torquer means are configured to act about two mutually orthogonal axes and each of said first and second structure-fixed torquer means are configured to directly engage said platform, wherein said torquer assembly comprises:

a stator having four pairs of pole pieces, said pole pieces being structure-fixed and angularly spaced from each other by 90° about an axis passing through said swivelling point, each pair consisting of an outer pole piece and an inner pole piece defining an air gap therebetween, said air gap being limited by spherical surfaces of said pole pieces, said spherical surfaces being curved about said swivelling point, permanent magnets which, together with said pole pieces provide a magnetic circuit generating a radial magnetic field within said air gap, wherein said permanent magnets are structure-fixed, and an armature connected with said platform, said armature having four elongated, arcuate coils with circumferentially extending turns, said coils being mutually offset by 90°, an arcuate coil section of each of said coils extending into the air gap of an associated one of said pairs of pole pieces;

wherein each of said coils has an arcuate inner section, an arcuate outer section and substantially radial, short end sections connecting said inner and outer sections, respectively; and said outer sections being movable in said air gaps between said pairs of pole pieces and wherein said outer sections are limited by spherical surfaces; and wherein said stator comprises a tubular central part of magnetizable material having a first end near said platform and a second end remote from said platform, said central part having radial flange elements at said remote end, said flange elements having integral magnet carriers with plane support surfaces substantially tangential with respect to said swivelling point;

said permanent magnets being flat-parallelepiped having an upper surface and a lower surface parallel thereto, and being magnetized perpendicular to said upper and lower surfaces, said lower surfaces of said permanent magnets being attached to respective ones of said magnet carriers;

said outer pole piece of each pair being attached to said upper surface of a respective one of said permanent magnets; and said inner pole pieces being integral with said tubular central part.

* * * * *